US007810711B2

(12) United States Patent  (10) Patent No.: US 7,810,711 B2
Halbur et al.  (45) Date of Patent: Oct. 12, 2010

(54) FINANCIAL TRANSACTION CARD ASSEMBLY WITH PACKAGED PRODUCT

(75) Inventors: Ted C. Halbur, Lino Lakes, MN (US); Travis M. Robertson, St. Louis Park, MN (US); Erin M. Borkowski, Andover, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 433 days.

(21) Appl. No.: 11/592,759

(22) Filed: Nov. 3, 2006

(65) Prior Publication Data

US 2008/0223939 A1  Sep. 18, 2008

(51) Int. Cl.
G06F 17/00 (2006.01)
(52) U.S. Cl. .................. 235/375; 235/380; 235/480; 235/493; 422/5
(58) Field of Classification Search .................. 235/494, 235/380, 480, 493; 428/34.2, 800
See application file for complete search history.

(56) References Cited

U.S. PATENT DOCUMENTS

| | | | |
|---|---|---|---|
| 4,277,024 A | 7/1981 | Spector | |
| 4,817,860 A | 4/1989 | Shapiro | |
| 4,883,692 A | 11/1989 | Spector | |
| 4,921,094 A | 5/1990 | van den Akken | |
| 5,148,983 A | 9/1992 | Muniz | |
| 5,304,358 A | 4/1994 | Hoyt et al. | |
| D366,107 S | 1/1996 | Shaffer | |
| 5,717,754 A | 2/1998 | Plenge | |
| 6,024,386 A | 2/2000 | Spector | |
| 6,254,836 B1 * | 7/2001 | Fry | 422/124 |
| 7,003,905 B1 | 2/2006 | Derges | |
| 7,004,398 B1 | 2/2006 | Francis et al. | |
| 7,198,196 B2 | 4/2007 | Halbur et al. | |
| 7,275,683 B2 | 10/2007 | Lazarowicz et al. | |
| 7,293,701 B2 | 11/2007 | Halbur et al. | |
| 7,314,179 B1 | 1/2008 | Halbur et al. | |
| 7,316,357 B2 | 1/2008 | Lindahl et al. | |
| 7,360,710 B2 | 4/2008 | Lindahl et al. | |
| 7,409,788 B2 | 8/2008 | Lauer et al. | |
| 2002/0004087 A1 * | 1/2002 | Baker | 426/112 |

(Continued)

OTHER PUBLICATIONS

"Stored-Value Card with Chemical Luminescence", U.S. Appl. No. 11/510,264 as filed on Aug. 25, 2006.

(Continued)

*Primary Examiner*—Thien M. Le
*Assistant Examiner*—Minghui Yang
(74) *Attorney, Agent, or Firm*—Griffiths & Seaton PLLC

(57) ABSTRACT

A financial transaction card assembly comprises a financial transaction card, a package, and at least one article. The financial transaction card includes an account identifier linking the financial transaction card to at least one of a financial account or a financial record. The package is separate from the financial transaction card and defines an internal cavity. The at least one article is enclosed within the internal cavity. The financial transaction card is maintained outside of the internal cavity and is removably coupled to the package. Methods of assembling a financial transaction card assembly, methods of encouraging purchase and facilitating use of a financial transaction card assembly, and other embodiments are also disclosed.

29 Claims, 8 Drawing Sheets

U.S. PATENT DOCUMENTS

| | | | |
|---|---|---|---|
| 2002/0143697 | A1 | 10/2002 | Gotfried |
| 2004/0182940 | A1 | 9/2004 | Biller |
| 2005/0111899 | A1 | 5/2005 | Steinschaden |
| 2005/0116462 | A1 | 6/2005 | Telleen |
| 2005/0229450 | A1* | 10/2005 | Larsen et al. ............... 428/40.1 |
| 2006/0013993 | A1 | 1/2006 | Havive et al. |
| 2006/0104933 | A1 | 5/2006 | Bell et al. |
| 2007/0241198 | A1 | 10/2007 | Halbur et al. |
| 2007/0267313 | A1 | 11/2007 | McLean |
| 2008/0054077 | A1 | 3/2008 | Zellner et al. |

OTHER PUBLICATIONS

Halbur, Ted C., et al., "Stored-Value Card with Magnet," U.S. Appl. No. 11/190,738, filed Jul. 27, 2005 (22 pgs.).

Color Copy of GiftCard with Backer Available at Target retail stores Dec. 26, 2004 (1 pg).

Car Air Freshener, available at http://suli.en.alibaba.com/product/50037373/50170015/Car_Air_Freshener, dated Sep. 11, 2006.

* cited by examiner

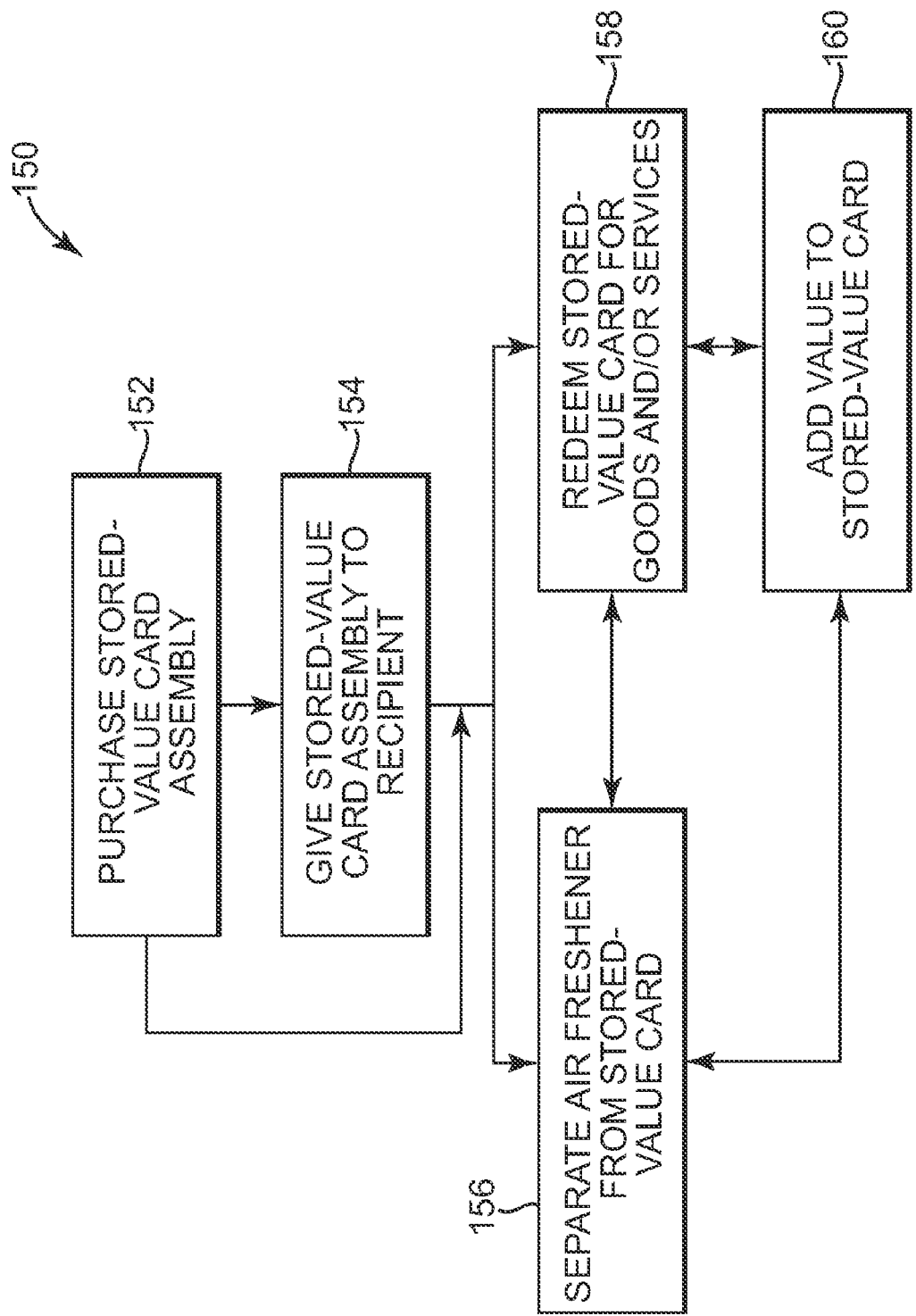

FINANCIAL TRANSACTION CARD ASSEMBLY WITH PACKAGED PRODUCT

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a financial transaction card assembly including a financial transaction card, a package, and at least one article. The financial transaction card includes an account identifier linking the financial transaction card to at least one of a financial account or a financial record. The package is separate from the financial transaction card and defines an internal cavity. The at least one article is enclosed within the internal cavity. The financial transaction card is maintained outside of the internal cavity and is removably coupled to the package. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 7 is a flow chart illustrating a method of using a stored-value card assembly, according to one embodiment of the present invention.

DETAILED DESCRIPTION

A stored-value card or other financial transaction card is adapted for making purchases of goods and/or services from e.g. a retail store or website. According to one embodiment, an original consumer buys a stored-value card to give a recipient who in turn is able to use a stored-value card at a retail store or a setting to pay for goods and/or services. A stored-value card assembly, according to embodiments of the present invention, not only provides the consumer with a stored-value card, but also provides the consumer with a packaged product. In one embodiment, the packaged product includes an air freshener or other suitable article(s). Inclusion of the packaged product in the stored-value card assembly promotes the sale and/or loading of the stored-value card by potential consumers and/or bearers of the stored-value card.

Figure 1:
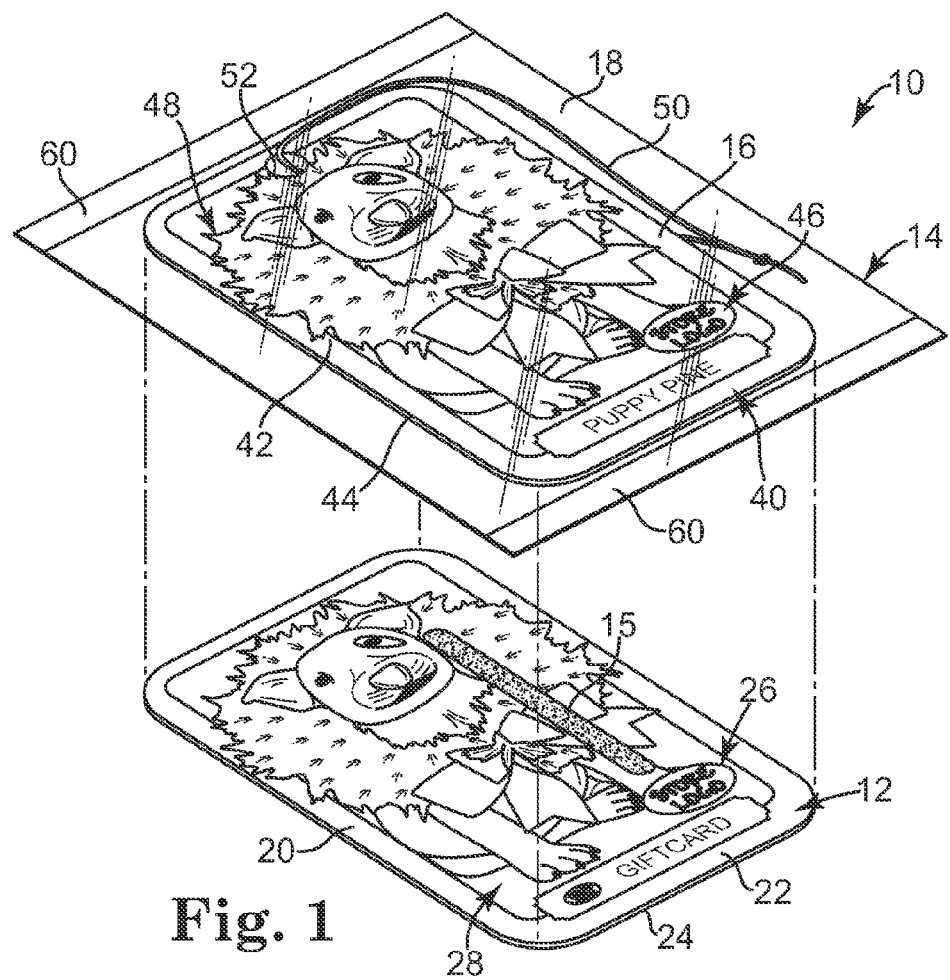
FIG. 1 is an exploded, top perspective view of a stored-value card assembly, according to one embodiment of the present invention.

Turning to the figures, FIG. 1 illustrates an exploded, top perspective view of a stored-value card assembly 10 (e.g., a dual-item assembly) according to an embodiment of the present invention. The stored-value card assembly 10 includes a stored-value card 12 or other financial transaction item and a packaged product or item 14 removably coupled to the stored-value card 12 in any suitable manner. In one example, stored-value card 12 is removably coupled to packaged product 14 with a readily removable adhesive 15 or other suitable coupling member, device, or substance.

Stored-value card 12 is configured to be used as tender toward the purchase of goods and/or services. In one example, stored-value card 12 provides overall rigidity to stored-value card assembly 10 and supports packaged product 14. Packaged product 14 consists of one or more articles 16 within a package 18 such as a wrapper. Article(s) 16 include any suitable combination of functional and/or amusing items. In one embodiment, article(s) 16 are relatively small and lightweight as will be further described below.

Figure 2A:
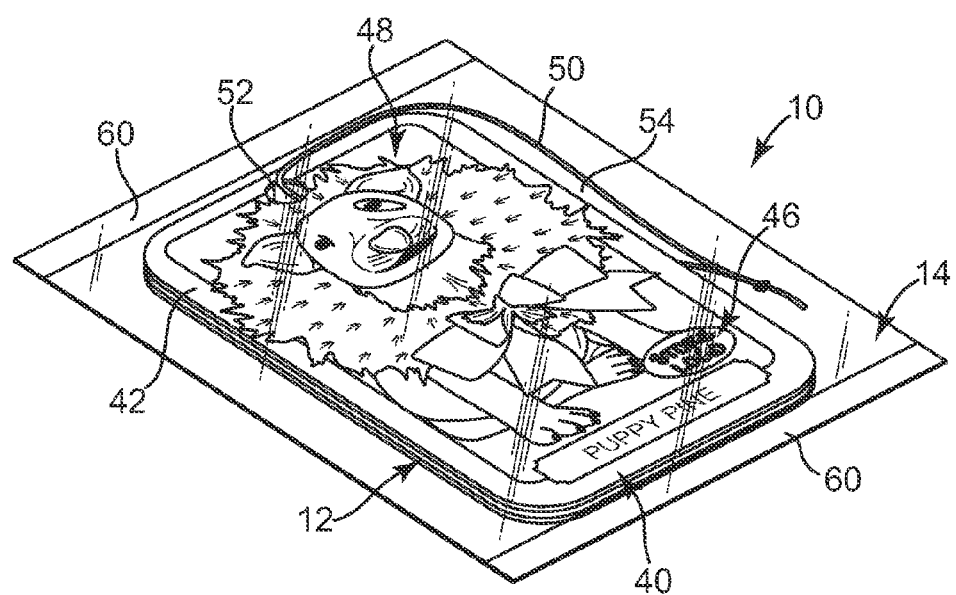
FIG. 2A is a top perspective view of a stored-value card assembly, according to one embodiment of the present invention.
Figure 2B:
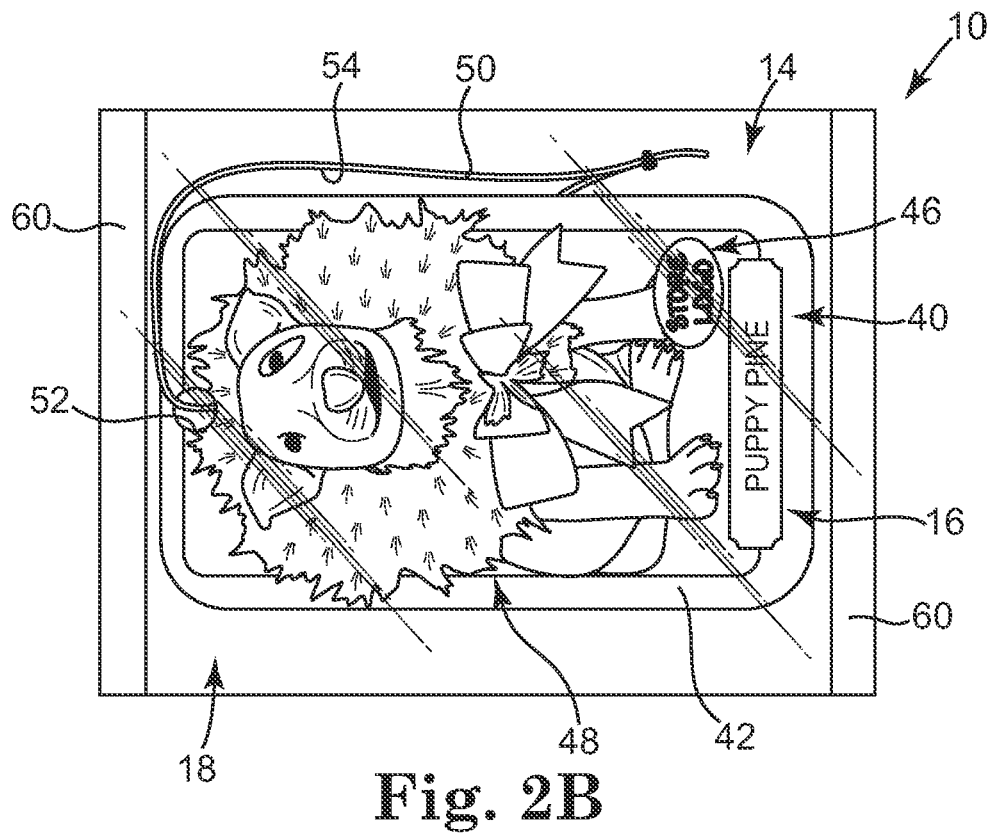
FIG. 2B is a front view of the stored-value card assembly of FIG. 2A.
Figure 2C:
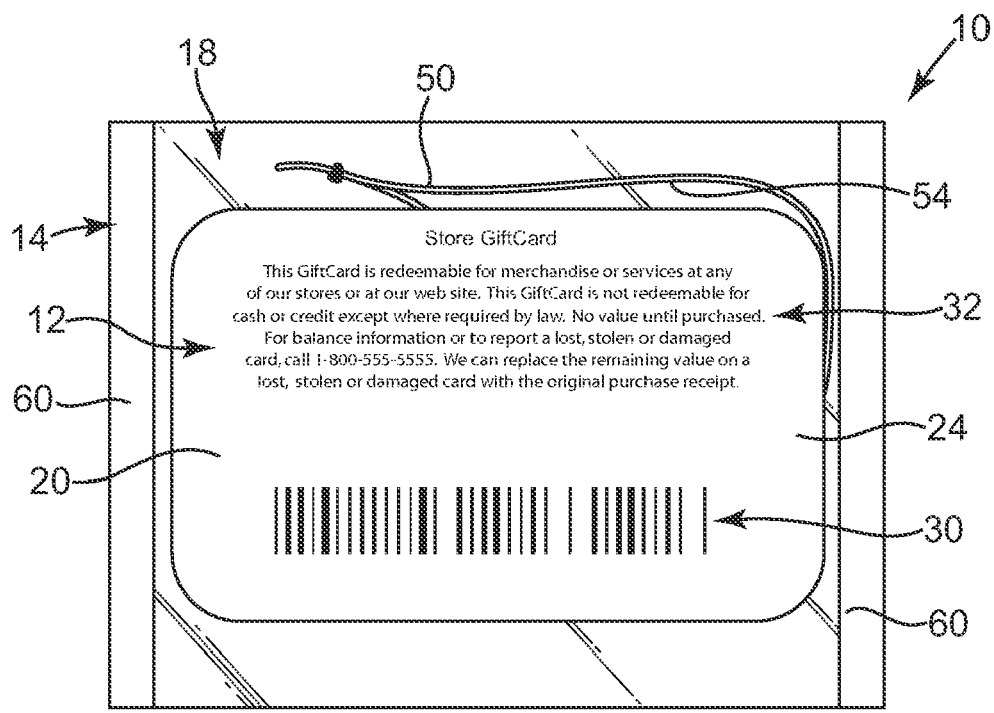
FIG. 2C is a rear view of the stored-value card assembly of FIG. 2A.
Figure 2D:
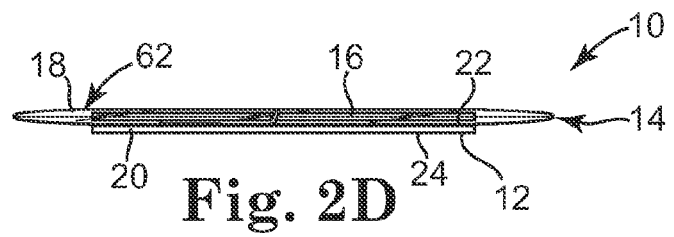
FIG. 2D is a top view of the stored-value card assembly of FIG. 2A.
Figure 2E:
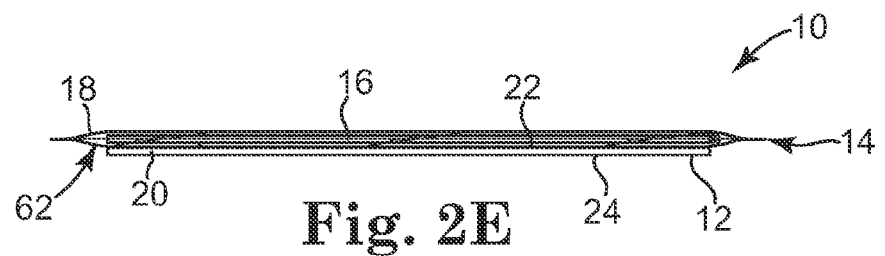
FIG. 2E is a right side view of the stored-value card assembly of FIG. 2A.

Referring to FIGS. 1-2E, stored-value card 12 includes a substantially planar panel 20 defining a first or front surface 22 and a second or rear surface 24 opposite the first surface 22. In one example, first and second surfaces 22 and 24 are each substantially planar. In one embodiment, panel 20 is generally rectangular in shape and is sized similar to that of an identification card, a credit card, or other card sized to fit in a wallet of a card bearer. In particular, in one embodiment, stored-value card 12 is about 8.5 cm long, about 5.4 cm wide, and less than about 1 mm thick. In other embodiments, panel 20 is otherwise shaped as a square, circle, oval, star, or any other suitable shape. Accordingly, panel 20 is formed of a somewhat rigid yet flexible material similar to that commonly used for identification cards, credit cards, etc. In one embodiment, panel 20 is formed of a paper, cardstock, plastic (e.g., polycarbonate or polyvinyl chloride), or other suitable material. In one embodiment, panel 20 is formed of injected molded plastic or cut from sheet-stock plastic material.

In one configuration of stored-value card assembly 10, first surface 22 is configured to interface packaged product 14 and, in one example, includes at least one of brand indicia 26 and decorative indicia 28. In one embodiment, brand indicia 26 identify a brand, e.g. a product brand, a store brand, etc., associated with stored-value card assembly 10. In one embodiment, first surface 22 is printed with or otherwise includes a background design, seasonal or holiday identifier, media format indicia, and/or other suitable indicia. Indicia 26 disposed on stored-value card 12 are one example of means for associating stored-value card assembly 10 with at least one of a product, a brand, a store, a holiday, a season, an occasion, a media format, e.g. characters, logos, scenes, or other illustrations or photographs related to at least one of a movie, television show, book, video game, etc.

Decorative indicia 28 are included on stored-value card 12 to provide stored-value card 12 with an aesthetically pleasing appearance to a bearer of stored-value card 12. In one embodiment, decorative indicia 28 are similar to or correspond with decorative indicia of packaged product 14, as will be further described below. In one embodiment, decorative indicia 28 include one or more of graphics, text, patterns, colors, or other suitable objects. In one embodiment, brand indicia 26 and decorative indicia 28 may be intermixed such as where a character or other icon associated with a brand is included in a decorative scene included in decorative indicia 28.

Referring to FIG. 2C, stored-value card 12 includes an account identifier 30, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 30 is printed on second surface 24 of stored-value card 12. Account identifier 30 indicates a financial account or record to which stored-value card 12 is linked. The financial account or record of the monetary balance on stored-value card 12 optionally is maintained on a database, other electronic or manual record-keeping system, or, in the case of "smart" cards for example, on a chip or other electronic device on stored-value card 12 itself. Accordingly, by reading account identifier 30, a financial account or record linked to stored-value card 12 is identified and can subsequently be activated, have amounts debited therefrom, and/or have amounts added thereto. Account identifier 30 is one example of means for associating stored-value card 12 with a financial account or a financial record.

In one embodiment, redemption indicia 32 are included on stored-value card 12, for example, on second surface 22. Redemption indicia 32 indicate that stored-value card assembly 10 is redeemable for the purchase of goods and/or services and that, upon use, a value of the purchased goods and/or services will be deducted from the financial account or record linked to stored-value card 12. In one embodiment, redemption indicia 32 include phrases such as "<NAME OF STORE>GiftCard" and "This GiftCard is redeemable for merchandise or services at any of our stores or at our website," and/or provides help or telephone line information in the case of a lost, stolen, or damaged stored-value card, etc. In one embodiment, other indicia are also included on second surface 24 including other objects, texts, backgrounds, graphics, etc.

Figure 3:
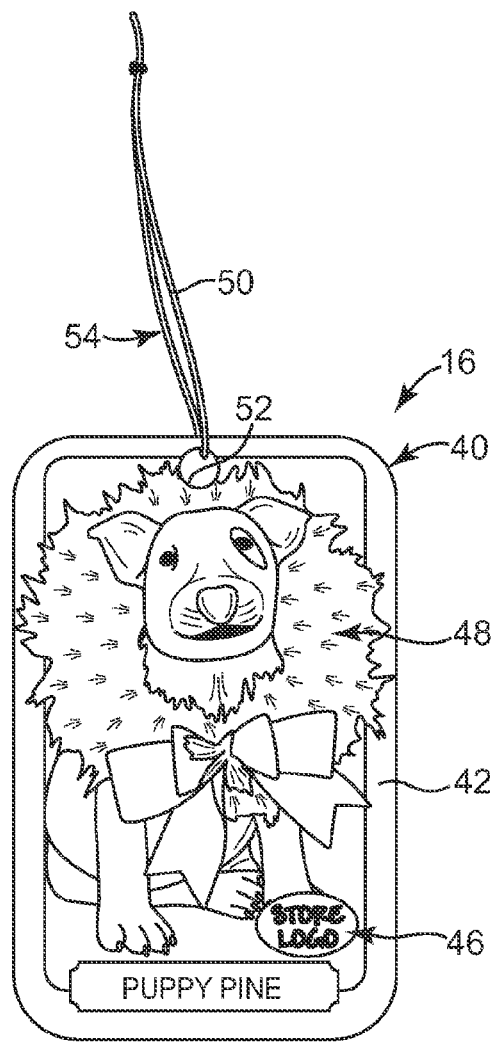
FIG. 3 is front view of the product included in the stored-value card assembly of FIG. 1, according to one embodiment of the present invention.

Referring to FIG. 3, in one embodiment, article(s) 16 of packaged product 14 include an air freshener or other fragrance carrier 40. In one example, air freshener 40 is substantially planar and defines a first or front side 42 and a second or rear side 44. In one example, air freshener 40 is sized similarly to stored-value card 12.

Air freshener 40 includes a material configured to exude an aroma or fragrance into the surrounding atmosphere. In general, air freshener 40 exudes fragrance upon exposure to the atmosphere without requiring interaction (e.g., scratching, etc.) with air freshener 40 to activate scent release. In one example, air freshener 40 includes a porous substrate such as cellulose fiber, card stock paper, etc. having voids or pores (not shown) dispersed therein. A liquid fragrance (not shown) is placed within at least some of the pores such that when the air freshener is exposed to the atmosphere, air freshener 40 releases the fragrance at a gradual rate. In one embodiment, the liquid fragrance is in the form of a fragrance oil or an essential oil. Use of other suitable materials to at least partially form air freshener 40 is also contemplated. For example, air freshener 40 includes a plastic, foam, gel, paper, or other substrate formed to include a desired aroma in the form of either a solid or a liquid fragrance.

In one embodiment, air freshener 40 includes brand indicia 46 and/ decorative indicia 48. Brand indicia 46 identify a brand, e.g. a product brand, a store brand, etc. associated with stored-value card assembly 10. In one example, brand indicia 46 are substantially similar to brand indicia 26 of stored-value card 12.

Decorative indicia 48 includes any text, graphics, and/or other suitable objects contributing to the aesthetic appearance of air freshener 40 and, in one embodiment, are included on one of or both sides 42 and 44 of air freshener 40. For example, decorative indicia 48 may include one or more of a background design, seasonal holiday scene or a design, characters, or any other suitable indicia. Decorative indicia 48 may also include information regarding the type of aroma or fragrance that will be exuded by air freshener 40 when air freshener 40 is removed from package 18. For example, where decorative indicia 48 include a picture of a puppy and includes a pine aroma, decorative indicia 48 may additionally include the phrase "Puppy Pine" or something of similar effect.

In one embodiment, decorative indicia 48 relate to subject matter associated with the selected scent of air freshener 40. For instance, where decorative indicia 48 relates to the Christmas holiday, the aroma of air freshener 40 may be pine, peppermint, etc. In other embodiments, decorative indicia 48 may relate to Halloween or Thanksgiving, cooking, a newborn baby, or other scene and air freshener 40 may respectively include an aroma emulating the smell of pumpkin pie, vanilla or cookies, baby powder, etc. Other corresponding combinations of decorative indicia 48 and aromas will be apparent to those of ordinary skill upon reading this disclosure.

In one embodiment, first side 42 and second side 44 each include similar brand indicia 46 and decorative indicia 48 or otherwise visual resemble or visually coordinate with each other. In one example, indicia 46 and 48 on one or both sides 44 and 46 of air freshener 40 are substantially similar to indicia 26 and 28 included on first surface 22 of stored-value card 12 except for a textural or graphical representation generally indicating which is air freshener 40 and which is stored-value card 12.

In one embodiment, article(s) 16 include a string or other hanging device 50 coupled with air freshener 40 and configured to facilitate hanging or otherwise positioning air freshener 40. In one example, air freshener 40 includes an aperture 52 near an edge thereof, and string 50 is thread through aperture 52 and tied to define a loop, generally indicated at 54, configured to be hung on any suitable support structure. Placing string 50 on a support structure hangs air freshener 40 from the support structure.

In one embodiment, other auxiliary article(s) 16 in addition or as an alternative to air freshener 40 are included in packaged product 14. For example, article(s) 16 may include one or more of playing cards, stickers, small trinkets, a greeting card, small game, small novelty article, etc. In one embodiment, each of article(s) 16 is configured to be stored in a relatively planar or thin manner and is relatively light weight so as not to complicate coupling of packaged product 14 to stored-value card 12. In one example, each article 16 is similar to or smaller in size than stored-value card 12. In one example, each article 16 is larger in size than stored-value card 12.

Package 18 is any suitable packaging configured to enclose air freshener 40 and to seal air freshener 40 from the atmosphere (i.e., is air tight), such that the aroma of air freshener 40 does not escape into the environment outside of package 18 until package 18 is opened by a bearer of stored-value card assembly 10. In one example, package 18 includes a flexible plastic (such as oriented polypropylene (OPP), cast polypropylene (CPP), polyethylene (PE), etc.) cellophane, or other suitable wrapper and/or a more rigid, substantially air-tight package sealed in any suitable manner. In one example, package 18 is a wrapper provided as a plastic sleeve configured to receive air freshener 40, cut to length, and sealed at each open end, as generally indicated at 60, to enclose air freshener 40 within a cavity 62 (FIGS. 2D and 2E) formed therein. In one embodiment, package 18 is one of translucent and transparent to allow viewing of a portion of first surface 42, for example, of a portion of brand indicia 46 and/or decorative indicia 48 through package 18.

Packaged product 14 is coupled with stored-value card 12 in any suitable manner such as with adhesive 15, a tie, a band, a second package around both stored-value card 12 and packaged product 14, tape, etc. In one embodiment, package 18 extends only around air freshener 40 and not around stored-value card 12 to prevent or at least decrease undesired transfer of aroma from air freshener 40 to stored-value card 12. By decreasing such aroma transfer, store-value card 12 can remain substantially scent-free further encouraging storage of stored-value card 12 in a bearer's wallet for future use toward the purchase of goods and/or services.

Figure 4A:
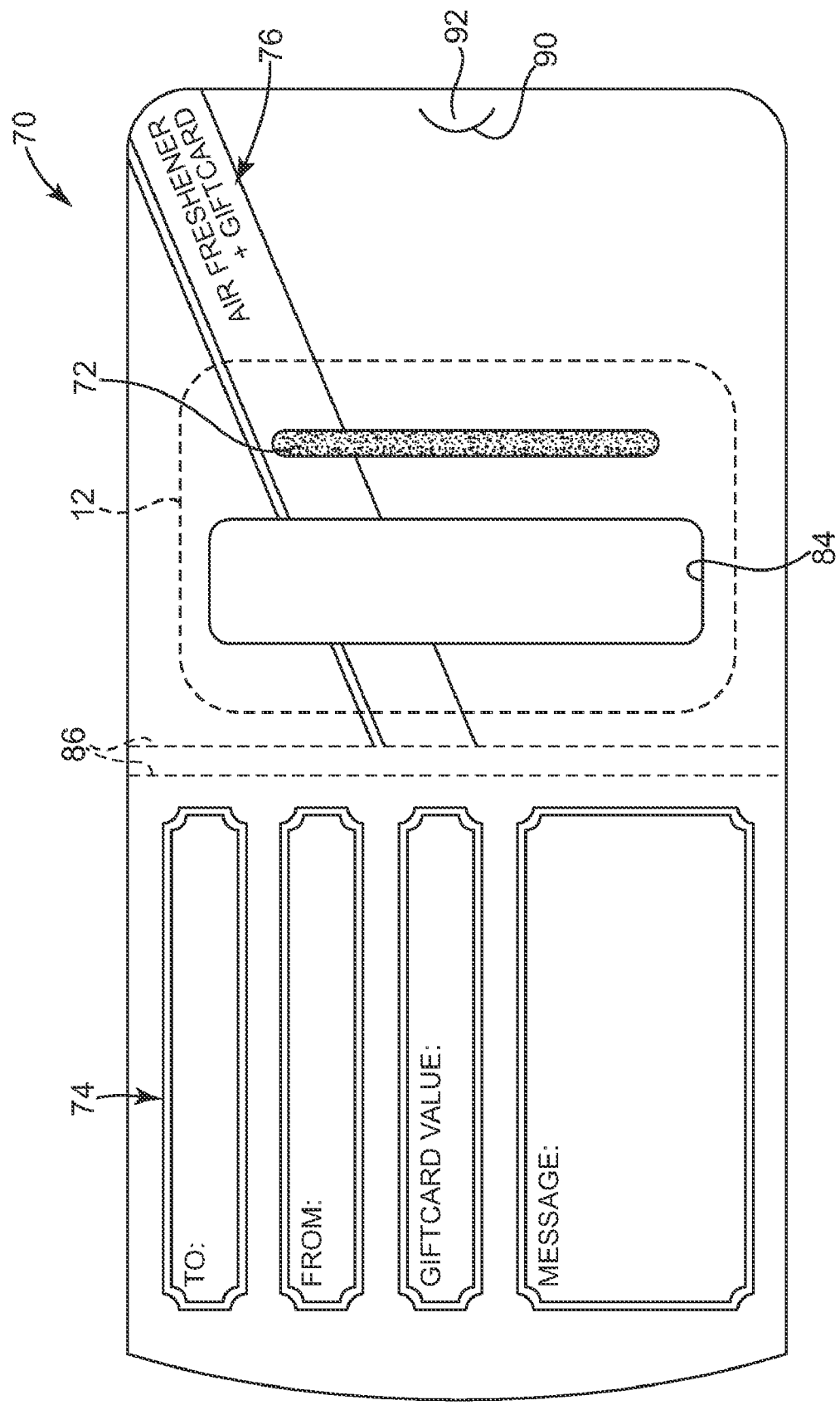
FIG. 4A is a front view of one embodiment of an unfolded backer for a supporting a stored-value card assembly, according to one embodiment of the present invention.
Figure 4B:
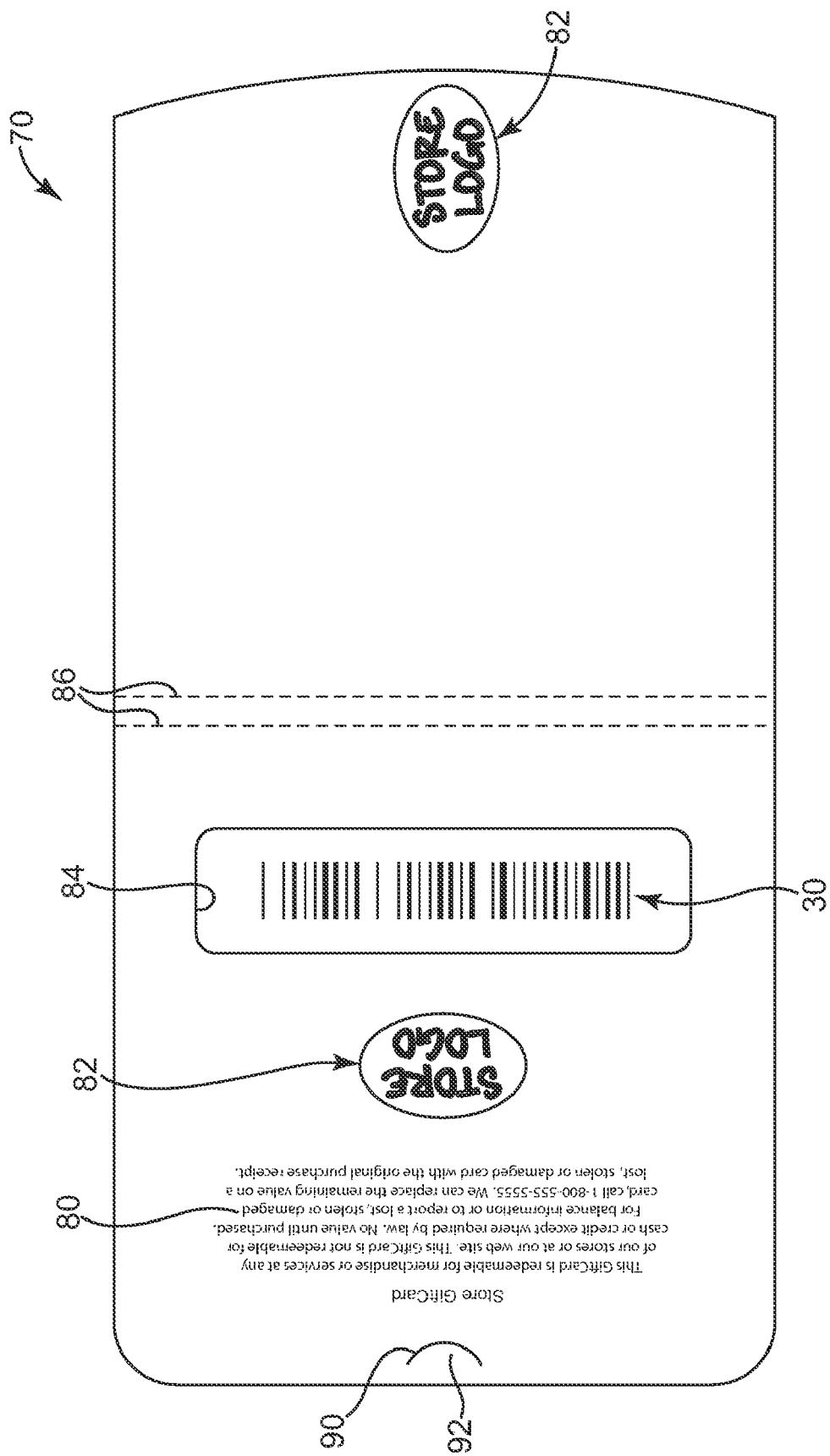
FIG. 4B is a rear view of the unfolded backer of FIG. 4A.

FIGS. 4A and 4B illustrate a carrier or backer 70 for supporting stored-value card assembly 10 (FIGS. 1-2E). Stored-value card 12, which is represented in phantom lines in FIG. 4A, is readily releasably attached to backer 70, for example by an adhesive 72 or the like. Backer 70 comprises a single layer or multiple layers of paper or plastic material, for example, generally in the form of a relatively stiff but bendable/flexible card. Use of other materials is also contemplated. Backer 70 displays indicia, graphics or text information including store logo(s), store name(s), slogans, advertising, instructions, directions, brand indicia, promotional information, holiday indicia, seasonal indicia, media format identifiers, characters, and/or other information.

Indicia 74 for example include to, from, initial gift card value, and message fields. Indicia 76 promote that stored-value card assembly 10 includes air freshener 40 (illustrated in FIG. 3) or other article(s) 16. In particular, in one example, indicia 76 state that stored-value card assembly 10 includes an "Air Freshener+GiftCard."

Indicia 80 (FIG. 4B) indicate that stored-value card 12 is redeemable for the purchase of goods and/or services and that upon use, a value of the purchased goods and/or services will be deducted from the financial account or record linked to stored-value card 12. In one embodiment, indicia 80 include phrases such as "<NAME OF STORE>GiftCard" and "This GiftCard is redeemable for merchandise or services at any of our stores or at our website," and/or provides help or phone line information in case of a lost, stolen, or damaged stored-value card 12, etc.

Brand indicia 82 identify a store, brand, department, etc. and/or services associated with stored-value card 12. Any of indicia 74, 76, 80, 82, or other indicia optionally may appear anywhere on backer 70 or stored-value card assembly 10. Additional information besides that specifically described and illustrated herein may also be included.

Backer 70 includes a window or opening 84 for displaying account identifier 30 of stored-value card 12 as illustrated in FIG. 4B. As previously described, account identifier 30 is adapted for accessing a financial account or a financial record associated with stored-value card 12 for activating, loading, or debiting from the financial account or financial record. Accordingly, window 84 allows access to account identifier 30 to activate and/or load stored-value card 12 without removing stored-value card assembly 10 from backer 70. In one embodiment, a portion of backer 70 alternatively is configured to be folded away from the remainder of backer 70 to access account identifier 30 without removing stored-value card assembly 10 from backer 70.

In one embodiment, backer 70 is a bi-fold substrate defining a fold line or multiple fold lines 86, about which backer 70 is foldable roughly in half. In FIGS. 4A and 4B, backer 70 is unfolded, i.e. is in an open configuration. For example, in one embodiment, to accommodate the overall thickness of stored-value card assembly 10, two fold lines 86 are included. According to one embodiment, FIG. 4A illustrates surfaces of backer 70 that will be supported on a rack or other fixture to be visible to a consumer of a retail store who is considering the purchase of stored-value card assembly 10. In another example, while on display in a retail store, backer 70 is folded back about fold line(s) 86 to present only the surfaces of backer 70 illustrated in FIG. 4A that are positioned on the same side of fold line(s) 86 as stored-value card assembly 10 to a consumer. In one embodiment, indicia 74 are not be visible to a consumer when backer 70 and stored-value card assembly 10 are placed for display in a retail store. Backer 70 is one example of means for supporting stored-value card assembly 10 for display in a retail setting.

After purchase, backer 70 is foldable about fold line(s) 86 such that the FIG. 4A surfaces of backer 70 are folded toward each other and stored-value card assembly 10 is enclosed in a compact package formed by foldable backer 70. In this manner, the surfaces of backer 70 illustrated in FIG. 4B are disposed toward the outside of the folded, compact-package, according to embodiments of the invention. In one embodiment, folded backer 70 effectively wraps stored-value card assembly 10 for presentation from a consumer to a recipient. Folding backer 70 in the other direction about fold line(s) 86 for display on a rack in a retail setting, or about other fold line(s)s of backer 70 is also contemplated.

In one embodiment, a cut 90 is formed through backer 70 near an edge of backer 70 that extends substantially parallel to fold line(s) 86. In one embodiment, cut 90 is substantially semi-circular and extends partially toward fold line(s) 86 and defines a substantially semi-circular flap 92, which can be partially bent away from the remainder of backer 70. More specifically, upon folding of backer 70 about fold line(s) 86, to close backer 70, an opposing edge of backer 70 is tucked beneath flap 92 to maintain backer 70 in a folded or closed position. Other backers similar to backer 70 can be used with various sizes and shapes of stored-value card assembly 10. Other backers or packages are also contemplated for supporting stored-value card assembly 10.

Figure 5:
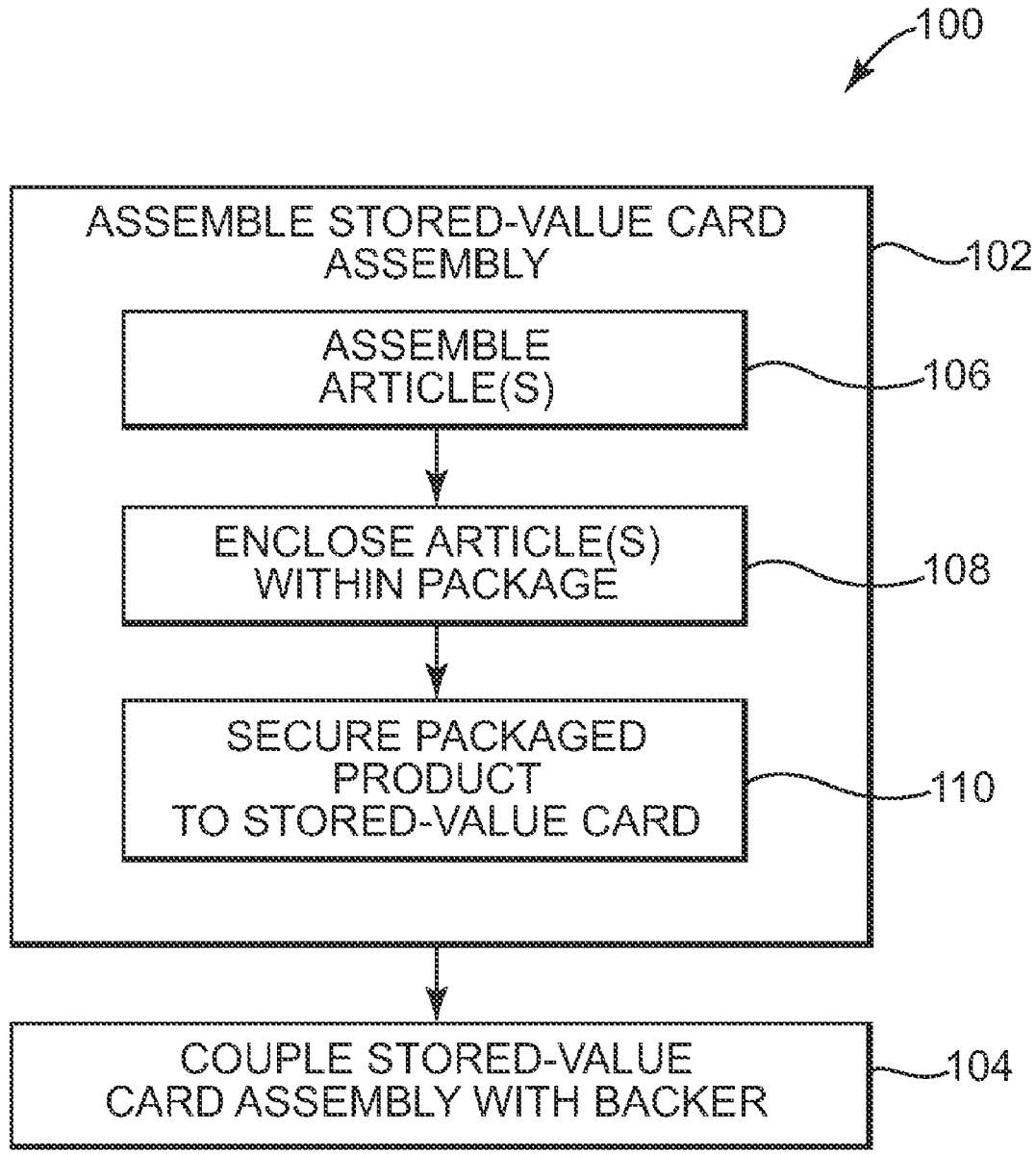
FIG. 5 is a flow chart illustrating a method of assembling a stored-value card assembly, according to one embodiment of the present invention.

FIG. 5 is a flow chart illustrating one embodiment of a method 100 of assembling stored-value card assembly 10. Referring to FIG. 5 in view of FIG. 1, at 102, stored-value card assembly 10 is assembled and, at 104, stored-value card assembly 10 is coupled with backer 70 (illustrated in FIGS. 4A and 4B). In particular, in one embodiment, assembling stored-value card assembly 10 at 102 includes assembling article(s) 16 at 106. For instance, at 102, string 50 is coupled with air freshener 40. In one embodiment, article(s) 16 may not require assembly beyond general manufacturing of article(s) 16.

At 108, article(s) 16 are enclosed within package 18 to form packaged product 14. For example, packer 18 in the form of a wrapper is placed around air freshener 40 to enclose air freshener 40 and to seal air freshener 40 from the surround atmosphere. At 110, packaged product 14 is secured to stored-value card 12 in any suitable fashion. In one embodiment, package 18 is adhered to first surface 22 of stored-value card 12.

At 104, the assembled stored-value card assembly 10 is coupled with backer 70 to form a retail product. In one example, stored-value card assembly 10 is coupled to backer 70 with adhesive 72 or other selectively releasable material or device. More specifically, in one embodiment, stored-value card 12, which is coupled with packaged product 14, is coupled to backer 70 with adhesive 72 or other selectively releasable material or device. In one embodiment, backer 70 is folded into a folded position for shipment and/or display to retail settings. Backer 70 is, more specifically, folded by folding backer 70 about fold line(s) 86 such that the backer surfaces illustrated in FIG. 4B are moved toward each other. As such, a portion of backer 70 with stored-value card assembly 10 is visible from one side of folded backer 70. Backer 70 can also be folded in the opposite direction about fold line(s) 86 to substantially enclose stored-value card assembly 10. In one embodiment, backer 70 is displayed in an unfolded position hung from a support arm within the retail setting.

Figure 6:
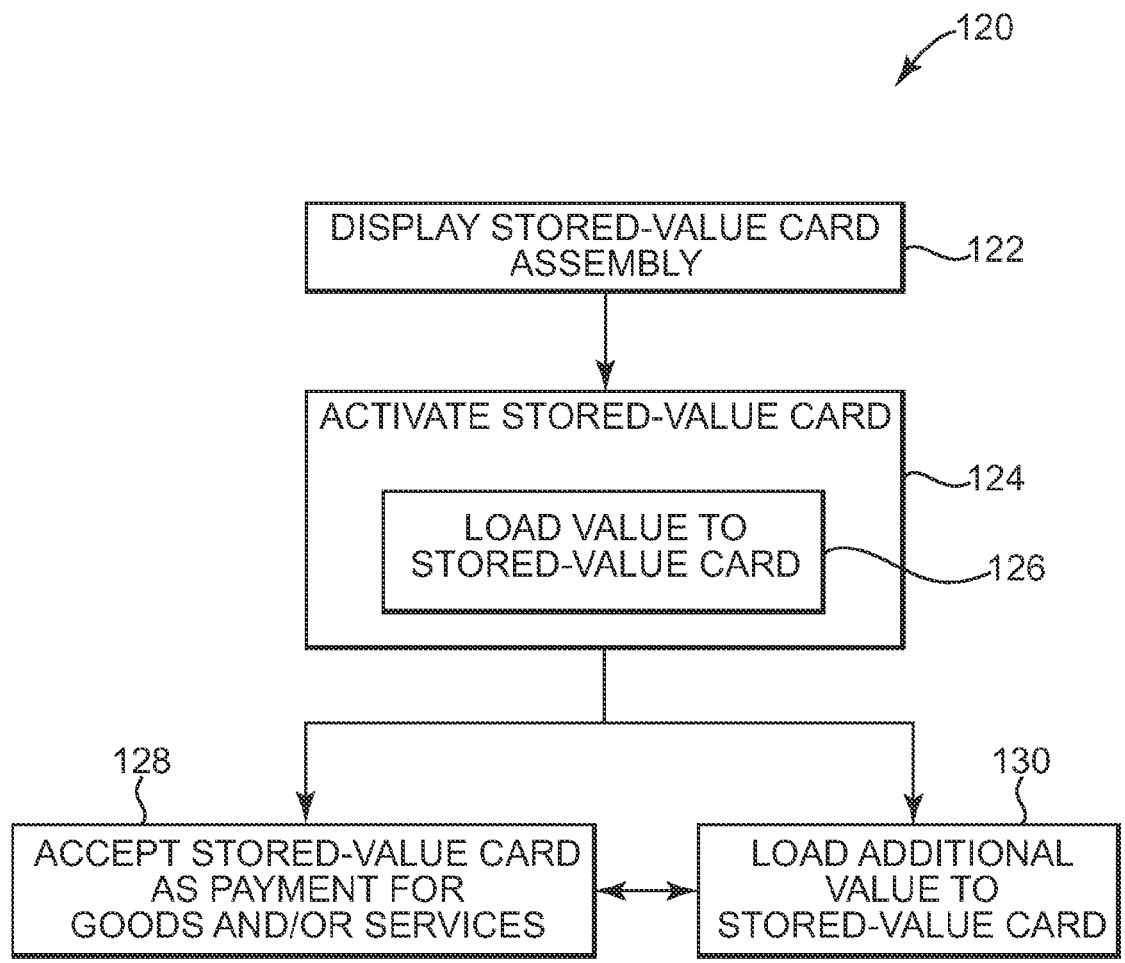
FIG. 6 is a flow chart illustrating a method of encouraging purchase and facilitating use of a stored-value card assembly, according to one embodiment of the present invention.

FIG. 6 is a flow chart illustrating one embodiment of a method 120 of providing stored-value card assembly 10 for sale and use by consumers. At 122, stored-value card assembly 10 is placed or hung from a rack, shelf, or other similar device to display stored-value card assembly 10 for sale to potential consumers. In one example, stored-value card assembly 10 is placed for retail sale when secured to backer 70. In one embodiment, a depiction of stored-value card assembly 10 is placed on website for viewing and purchase by potential consumers. In one embodiment, stored-value card assembly 10 is displayed without backer 70.

At 124, a consumer who has decided to purchase stored-value card assembly 10 presents the stored-value card assembly 10 on backer 70 to a retail store employee, retail store kiosk, or other person or device to read account identifier 30 at stored-value card 12 to access a financial account or financial record linked to account identifier 30. In particular, account identifier 30 is read or otherwise accessed through window 84 of backer 70. Upon accessing the financial account or financial record, at 126, value is added to the financial account or financial record. Thus, stored-value card 12 is activated and loaded. Once stored-value card 12 is activated and loaded, stored-value card 12 can be used by the consumer or any other bearer of stored-value card 12 to purchase goods and/or services at the retail store or other affiliated retail setting or website.

At 128, the retail store or other affiliated retail setting or website accepts stored-value card 12 as payment toward the purchase of goods and/or services made by the current bearer of stored-value card 12. In particular, the value currently loaded on stored-value card 12 is applied toward the purchase of goods and/or services. At 130, additional value is optionally loaded on stored-value card 12 at a point of sale terminal, kiosk, or other area of the retail store or related setting. Upon accepting stored-value card 12 as payment at 128, the retail store or related setting can subsequently perform either operation 128 or operation 130 as requested by a current bearer of stored-value card 12. Similarly, upon loading additional value on stored-value card 12 at 130, the retail store or related setting can subsequently perform either operation 130 again or operation 128. In one example, the ability to accept stored-value card 12 as payments for goods and/or services is limited by whether the financial account or financial record associated with stored-value card 12 has any value at the time of redemption.

FIG. 7 is a flow chart illustrating one embodiment of a method 150 of using stored-value card assembly 10. At 152, a potential consumer of stored-value card assembly 10, which is displayed in a retail store or viewed on a website, decides to and does purchase stored-value card assembly 10 from a retail store or website setting. Stored-value card assembly 10 can be displayed and purchased alone or as part of a retail product along with backer 70. Upon purchasing a stored-value card assembly 10, a retail store employee, a retail store kiosk, or other person or device scans or otherwise reads account identifier 30. In one embodiment, account identifier 30 is read through window 84 of backer 70. Upon reading account identifier 30, the financial account or record linked to account identifier 30 is accessed and activated to load value onto stored-value card 12.

At 154, the consumer optionally gives stored-value card assembly 10 to a recipient, such as a graduate, relative, friend, expectant parents, one having a recent or impending birthday, a couple having a recent or impending anniversary, etc. In one embodiment, a plurality of stored-value card assemblies 10 are purchased and given to party goers, such as at a birthday party, New Year's Eve party, for Christmas, etc. as party favors or gifts. As an alternative, the consumer can keep stored-value card assembly 10 for his or her own use.

At 156, the consumer or recipient, whoever is in current ownership or otherwise is the current bearer of stored-value card assembly 10, removes stored-value card assembly 10 from backer 70 if stored-value card assembly 10 is coupled with backer 70. For example, stored-value card assembly 10 is removed from backer 70 by overcoming the coupling force of adhesive 72. The current bearer of stored-value card assembly 10 additionally or alternatively separates packaged product 14 from stored-value card 12. In particular, package 18 is removed from stored-value card 12 by overcoming the coupling force of adhesive 15. During or after this operation, the bearer of stored-value card 12 can optionally open package 18 and use or play with article (s) 16. For instance, package 18 is opened and air freshener 40 is hung from a support structure with string 50 or otherwise positioned in a desired space to exude aroma to the space, thereby imparting the aroma into the atmosphere within a space.

At 158, the current bearer of stored-value card 12 redeems stored-value card 12 for goods and/or services from the retail store or website. At 160, the current bearer of stored-value card 12 optionally adds value to stored-value card 12, and more particularly, to the financial account or financial record associated with stored-value card 12, at the retail store or over the Internet. Upon removing packaged product 14 at 156, redeeming stored-value card 12 at 158, or adding value to stored-value card 12 at 160, the current bearer of stored-value card assembly 10 subsequently can perform any of operations 156, 158, or 160 as desired. In one embodiment, the ability of the current bearer to repeat redeeming stored-value card 12 at 158 is limited by whether the financial account or financial record associated with stored-value card 12 has any remaining value at the time of attempted redemption.

Although described above as occurring at a single retail store or website, in one embodiment, purchasing stored-value card assembly 10 at 152, redeeming stored-value card 12 at 158, and adding value to stored-value card 12 at 160, can each be performed at any one of a number of stores adapted to accept stored-value card 12 or over the Internet. In one example, a number of stores are each part of a chain or similarly branded stores. In one example, a number of stores includes at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a financial account or financial record associated with a stored-value card. The balance associated with the stored-value card declines as the card is used, encouraging repeat visits. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives, changes, an modifications within the scope of the invention will be apparent to those of ordinary skill in the art upon reading this disclosure.

What is claimed is:

1. A method of encouraging purchase and facilitating use of a financial transaction card, the method comprising:
    displaying a financial transaction card assembly comprising:
        the financial transaction card including an account identifier linking the financial transaction card to at least one of a financial account or financial record;
        a package separate from the financial transaction card defining an internal cavity; and
        at least one article enclosed within the internal cavity;
        wherein the financial transaction card is maintained outside of the internal cavity and is removably and directly coupled to the package, and the package is a flexible wrapper; and;
    activating the financial transaction card by accessing the account identifier, wherein activating the financial transaction card readies the financial transaction card for subsequent use as payment for one or more goods and services.

2. The method of encouraging purchase and facilitating use of a financial transaction card of claim 1, wherein the package separates the at least one article from the financial transaction card.

3. The method of encouraging purchase and facilitating use of a financial transaction card of claim 1, in combination with a backer configured to support and to selectively wrap the financial transaction card assembly.

4. The method of encouraging purchase and facilitating use of a financial transaction card of claim 3, wherein the package is removably and directly coupled to the financial transaction card with removable adhesive.

5. The method of encouraging purchase and facilitating use of a financial transaction card of claim 1, wherein:
    the financial transaction card includes:
        a first surface facing a direction; and
        a second surface facing an opposite direction of the first surface;
    the package includes:
        a third surface facing the direction; and
        a fourth surface facing the opposite direction;
    the first surface is removably and directly coupled to the fourth surface such that the financial transaction card and the package are adjacent to one another on the financial transaction card assembly; and
    the account identifier is located on the second surface.

6. The method of encouraging purchase and facilitating use of a financial transaction card of claim 5, wherein the package consists of a single piece of material folded to define the internal cavity.

7. The method of encouraging purchase and facilitating use of a financial transaction card of claim 6, wherein the single piece of material defines an interior side and an exterior side opposite the interior side, the single piece of material is folded to define the internal cavity directly adjacent the interior side, and the exterior side defines both the third surface and the fourth surface of the package.

8. The method of encouraging purchase and facilitating use of a financial transaction card of claim 5, wherein:
    a single material defines each of the third surface, the fourth surface, and the internal cavity; and
    the single material is closed around all sides of the internal cavity.

9. A method of encouraging purchase and facilitating use of a financial transaction card, the method comprising:
    displaying a financial transaction card assembly comprising:
        the financial transaction card including an account identifier linking the financial transaction card to at least one of a financial account or financial record;
        a package separate from the financial transaction card defining an internal cavity; and
        at least one article enclosed within the internal cavity;
        wherein the financial transaction card is maintained outside of the internal cavity and is removably and directly coupled to the package, and the at least one article includes an air freshener; and;
    activating the financial transaction card by accessing the account identifier, wherein activating the financial transaction card readies the financial transaction card for subsequent use as payment for one or more goods and services.

10. The method of encouraging purchase and facilitating use of a financial transaction card of claim 9, wherein the air freshener includes a hanging device.

11. The method of encouraging purchase and facilitating use of a financial transaction card of claim 9, wherein the at least one article includes an article that is one of sized similarly to and sized smaller than the financial transaction card.

12. The method of encouraging purchase and facilitating use of a financial transaction card of claim 9, wherein the package is configured to seal the at least one article from the atmosphere.

13. The method of encouraging purchase and facilitating use of a financial transaction card of claim 9, wherein the package is substantially transparent.

14. The method of encouraging purchase and facilitating use of a financial transaction card of claim 9, wherein the package is removably and directly coupled to the financial transaction card with removable adhesive.

15. The method of encouraging purchase and facilitating use of a financial transaction card of claim 9, wherein the package is an airtight package.

16. The method of claim 15, wherein:
the financial transaction card includes:
a first surface facing a direction, and
a second surface facing an opposite direction of the first surface;
the packaged product includes:
a third surface facing the direction, and
a fourth surface facing the opposite direction;
the account identifier is located on the second surface; and
removably coupling the financial transaction card to an exterior of the packaged product comprises removably and directly coupling the first surface to the fourth surface such that the financial transaction card and the packaged product are adjacent to one another on the stored-value card assembly.

17. A method of encouraging purchase and facilitating use of a financial transaction card, the method comprising:
displaying a financial transaction card assembly comprising:
the financial transaction card including an account identifier linking the financial transaction card to at least one of a financial account or financial record;
a package separate from the financial transaction card defining an internal cavity; and
at least one article enclosed within the internal cavity;
wherein the financial transaction card is maintained outside of the internal cavity and is removably and directly coupled to the package, the financial transaction card defines a first surface including a first indicia, and the at least one article includes a second surface including a second indicia, and wherein the first indicia is substantially similar to the second indicia; and;
activating the financial transaction card by accessing the account identifier, wherein activating the financial transaction card readies the financial transaction card for subsequent use as payment for one or more goods and services.

18. The method of encouraging purchase and facilitating use of a financial transaction card of claim 17, wherein the package is removably and directly coupled to the financial transaction card with removable adhesive.

19. The method of encouraging purchase and facilitating use of a financial transaction card of claim 17, wherein the at least one article includes an air freshener.

20. The method of encouraging purchase and facilitating use of a financial transaction card of claim 17, wherein the at least one article includes an article that is one of sized similarly to and sized smaller than the financial transaction card.

21. The method of encouraging purchase and facilitating use of a financial transaction card of claim 17, wherein the package is substantially transparent.

22. The method of encouraging purchase and facilitating use of a financial transaction card of claim 17, further wherein the package separates the at least one article from the financial transaction card.

23. A method of encouraging purchase and facilitating use of a financial transaction card, the method comprising:
displaying a financial transaction card assembly comprising:
the financial transaction card including an account identifier linking the financial transaction card to at least one of a financial account or financial record;
a package separate from the financial transaction card defining an internal cavity;
at least one article enclosed within the internal cavity, wherein the financial transaction card is maintained outside of the internal cavity and is removably and directly coupled to the package; and
a backer configured to support and to selectively wrap the financial transaction card assembly, wherein the backer includes an aperture, and the financial transaction card is positioned upon the backer such that the account identifier of the financial transaction card is accessible through the aperture of the backer; and
activating the financial transaction card by accessing the account identifier, wherein activating the financial transaction card readies the financial transaction card for subsequent use as payment for one or more goods and services.

24. A method of encouraging purchase and facilitating use of a stored-value item, the method comprising:
a step for displaying a dual-item assembly comprising:
the stored-value item including means for associating the stored-value item with a financial account or financial record;
an auxiliary item including means for exuding a fragrance;
means for directly coupling the stored value item to the auxiliary item; and
means for hanging the auxiliary item from a support structure, and;
a step for activating the stored-value item.

25. The method of encouraging purchase and facilitating use of a stored-value item of claim 24, wherein the means for coupling includes means for enclosing the auxiliary item separate from the stored-value item.

26. The method of encouraging purchase and facilitating use of a stored-value item of claim 25, wherein the means for enclosing the auxiliary item includes means for sealing the auxiliary item from a surrounding atmosphere.

27. The method of encouraging purchase and facilitating use of a stored-value item of claim 24, wherein the dual-item assembly further comprises means for hanging the auxiliary item from a support structure.

28. A method of encouraging purchase and facilitating use of a financial transaction card, the method comprising:
displaying a financial transaction card assembly including the financial transaction card having a first surface facing a direction and a second surface facing an opposite direction of the first surface, and a product enclosed within a package formed separately from the financial transaction card, the package having a third surface facing the direction and a fourth surface facing the opposite direction, the fourth surface being selectively and directly coupled to the first surface of the financial transaction card such that the financial transaction card and the package are adjacent to one another on the financial transaction card assembly, wherein the financial transaction card includes an account identifier located on the second surface and linked to a financial account or a financial record; and
activating the financial transaction card by accessing the account identifier, wherein activating the financial transaction card readies the financial transaction card for subsequent use as payment for one or more of goods and services;
wherein the product is an air freshener configured to exude a fragrance, and wherein displaying the financial transaction card assembly includes substantially containing the fragrance with the package enclosing the product.

29. A method of encouraging purchase and facilitating use of a financial transaction card, the method comprising:
    displaying a financial transaction card assembly comprising:
        the financial transaction card including an account identifier linking the financial transaction card to at least one of a financial account or a financial record, wherein the financial transaction card includes:
            a first surface facing a direction, and
            a second surface facing an opposite direction of the first surface, wherein the account identifier is located on the second surface;
        a package separate from the financial transaction card defining an internal cavity, wherein the package consists of a single piece of material folded to define the internal cavity, and the package includes:
            a third surface facing the direction, and
            a fourth surface facing the opposite direction, wherein the first surface is removably and directly coupled to the fourth surface such that the financial transaction card and the package are adjacent to one another on the financial transaction card assembly; and
        at least one article enclosed within the internal cavity;
        wherein the financial transaction card is maintained outside of the internal cavity and is removably and directly coupled to the package, and the package comprises a back panel directly adjacent to both the first surface of the financial transaction card and the at least one article; and
    activating the financial transaction card by accessing the account identifier, wherein activating the financial transaction card readies the financial transaction card for subsequent use as payment for one or more goods and services.

* * * * *